United States Patent [19]
Keller

[11] 4,411,402
[45] Oct. 25, 1983

[54] ADJUSTABLE INDICATOR HOLDERS

[76] Inventor: Max P. Keller, 3330 Ledyard Way, Aptos, Calif. 95003

[21] Appl. No.: 203,358

[22] Filed: Nov. 3, 1980

[51] Int. Cl.³ .............................................. E04G 3/00
[52] U.S. Cl. .................................................. 248/284
[58] Field of Search ............... 248/284, 278, 279, 291, 248/276, 280.1, DIG. 4; 33/172 D, 172 B, 172 R, DIG. 2

[56] References Cited

U.S. PATENT DOCUMENTS

| | | | |
|---|---|---|---|
| 1,487,119 | 3/1924 | Newitt | 33/172 D |
| 2,494,698 | 1/1950 | Forrest | 248/278 X |
| 2,616,692 | 11/1952 | Bird | 248/284 X |
| 2,663,764 | 12/1953 | Holmes | 248/279 X |
| 2,721,390 | 11/1955 | Pasturczak | 33/172 R |
| 3,028,675 | 4/1962 | Mahlmeister et al. | 33/DIG. 2 |
| 3,129,918 | 4/1964 | Bradley | 248/276 |
| 3,781,999 | 1/1974 | Colangelo | 33/172 R X |
| 4,208,157 | 6/1980 | Guarino et al. | 33/172 D |

*Primary Examiner*—William H. Schultz
*Assistant Examiner*—Ramon O. Ramirez
*Attorney, Agent, or Firm*—Hamrick, Hoffman & Guillot

[57] ABSTRACT

An adjustable indicator holder including a body member rigidly attached to a shaft adapted to be engaged by a spindle, a lever arm pivotally secured to the body member and having fine adjustment means engaging one end thereof, an articulated linkage, one end of which is pivotally secured to the other end of the lever arm and clamping means disposed at the distal end of the articulated linkage for matingly engaging a standard linear indicator device.

8 Claims, 6 Drawing Figures

U.S. Patent  Oct. 25, 1983  4,411,402
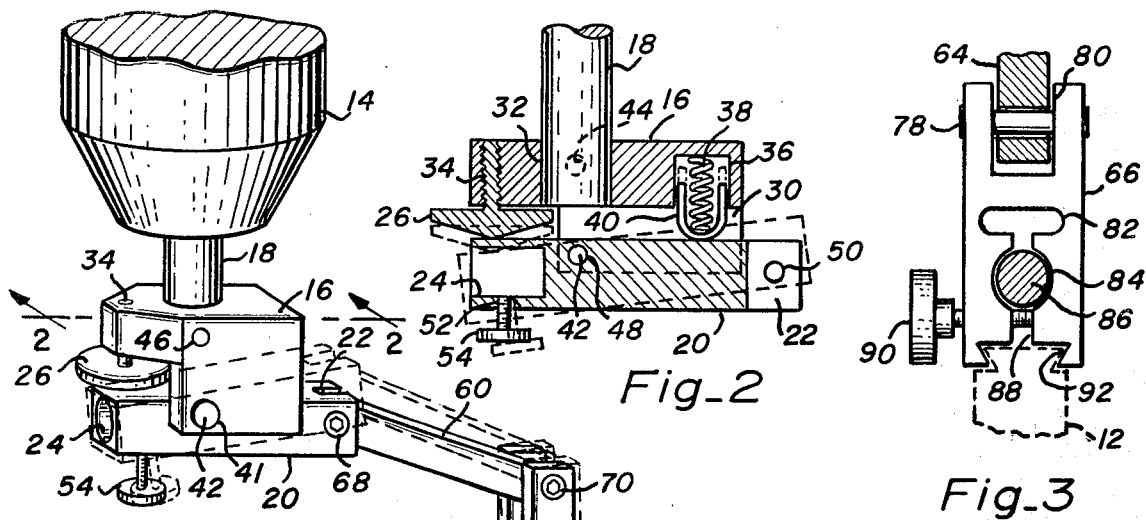
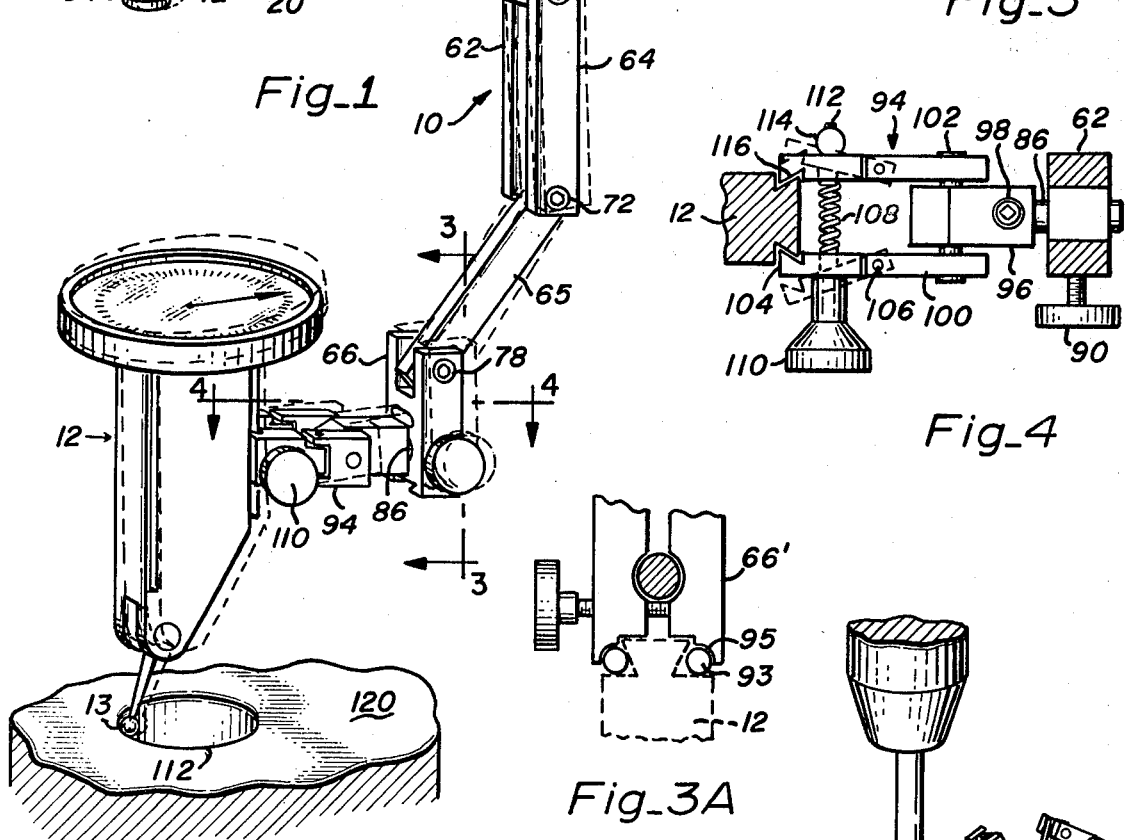
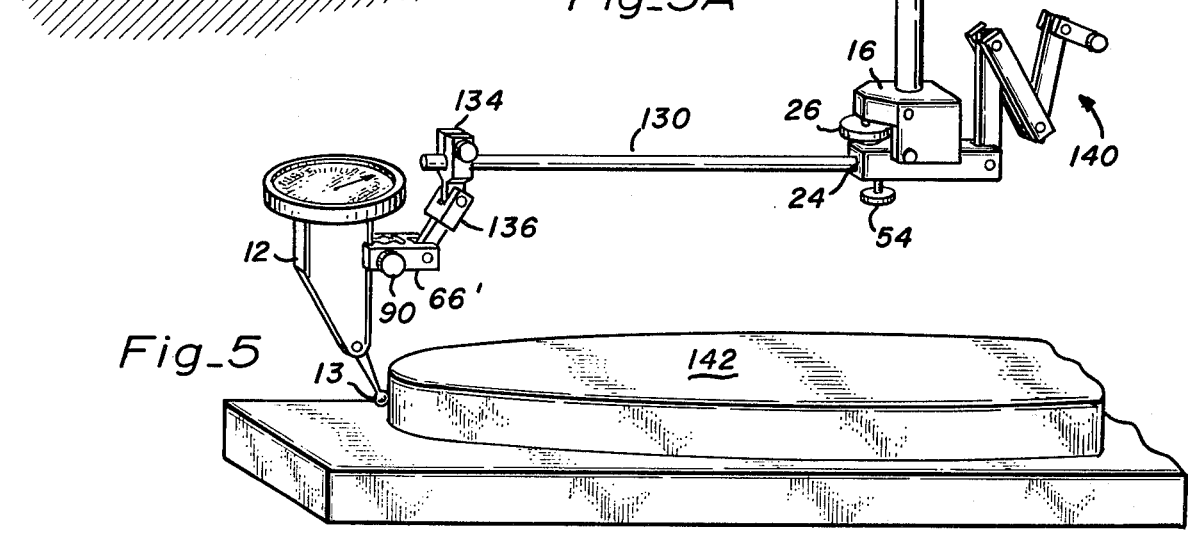

ADJUSTABLE INDICATOR HOLDERS

BACKGROUND OF THE INVENTION

1. Field of the Invention

The present invention relates generally to adjustable indicator holders of the type used to center a work piece on a milling machine, drill press, jig bore machine, numerical controlled machine, etc., and more particularly to a holder which allows positioning of an indicator in a wide variety of dispositions with fine adjustment capability.

2. Discussion of the Prior Art

Adjustable indicator holders have long been known in the prior art. See for example the U.S. Pat. Nos. 1,206,668, for Caron, 2,716,285, Rudhart, 3,028,675 Mahlmeister et al, and 3,129,918 Bradley. Although such devices have long been available, they have not enjoyed wide spread usage either because they do not allow quick and simple fine adjustment or because they require multiple adjustments of components with fine adjustment only along a single axis.

SUMMARY OF THE PRESENT INVENTION

It is therefore a principle objective of the present invention to provide an adjustable indicator holder which allows an indicator to be quickly positioned relative to a work piece yet is provided with means for fine adjustment via a single adjusting wheel.

Another objective of the present invention is to provide an adjustable indicator holder including one or more articulated linkages which allow the indicator to be quickly positioned in the general location of a desired contact and further includes a single fine tune adjustment mechanism.

Briefly, a preferred embodiment of the present invention includes a body member rigidly attached to a shaft adapted to be engaged by a spindle, a lever arm pivotally secured to the body member and having fine adjustment means engaging one end thereof, an articulated linkage, one end of which is pivotally secured to the other end of the layer arm and clamping means disposed at the distal end of the articulated linkage for matingly engaging a standard linear indicator device.

An important advantage of the present invention is that once the device is inserted in a spindle, the indicator can be readily positioned and fine adjusted using one hand.

Another advantage of the present invention is that it can assume a multitude of positions thus making it possible to center a spindle relative to almost any type of works piece.

These and other objects of the present invention will no doubt become apparent to those of ordinary skill in the art after having read the following detailed description of the preferred embodiments illustrated in the several figures of the drawing.

IN THE DRAWING

FIG. 1 is a perspective view illustrating a preferred embodiment of an indicator holder in accordance with the present invention;

FIG. 2 is a cross section taken along the line 2—2 in FIG. 1 and illustrating the internal configuration of the holder member;

FIG. 3 is an elevational view and partial cross section taken along the line 3—3 in FIG. 1;

FIG. 3A is an elevational view and partial cross section similar to FIG. 3 and showing a modification of the device in accordance with the present invention;

FIG. 4 is a plan view and partial cross section taken along the line 4—4 in FIG. 1 and illustrating a clamping member in accordance with the present invention; and FIG. 5 is a perspective view illustrating a modification of an adjustable indicator holder in accordance with the present invention.

DETAILED DESCRIPTION OF THE PREFERRED EMBODIMENTS

Referring now to FIG. 1 of the drawing, there is shown generally at 10 an adjustable holder for holding an indicator 12 in position relative to a spindle 14. The holder 10 includes a body member 16 rigidly secured to a shaft 18 which may be longer or shorter than illustrated as needed for the job and adapted to be engaged by the chuck of spindle 14. Pivotally affixed to body member 16 is a lever arm 20 having a notched recess 22 at one end and an extender shaft receiving cavity 24 provided at the opposite end. Positioned immediately above the said opposite end is a fine adjustment thumb wheel 26 which is carried by body member 16 and engages the top of arm 20.

Referring now additionally to FIG. 2 of the drawing, which is a cross section taken along the line 2—2 of FIG. 1, it will be seen that the lower portion of body member 16 is provided with a laterally extending channel 30 for receiving the lever arm 20, a vertically extending bore 32 for receiving the shaft 18, a threaded bore 34 for receiving the threaded shaft of thumb wheel 26, an internally disposed bore 36 extending upwardly from channel 30 for receiving a spring 38 and a contact cup 40 which contacts the upper surface of lever arm 20, and a bore 41 for receiving the pivot pin 42 which holds lever arm 20 in place. Body member 16 also includes a threaded bore 44 (shown in phantom) for receiving a lock screw 46 which rigidly secures body member 16 to shaft 18.

In addition to the recess 22 and bore 24, lever arm 20 includes a bore 48 for receiving the pivot pin 42, a pivot pin receiving bore 50 and a threaded bore 52 for mating with a locking thumb screw 54 to be described below. Note that in operation spring 38 will exert a strong force against lever arm 20 causing it to firmly engage the bottom surface of thumb wheel 26. However, by rotating thumb wheel 26 lever arm 20 can be caused to rotate about pivot pin 42 depressing spring 38 and forcing cup 40 upwardly into the bore 36.

Now referring back to FIG. 1 of the drawing, holder 10 further includes an articulated linkage comprised of elongated linkage members 60, 62, 64 and 65 and a first clamping member 66. The members 60–66 are pivotally secured to arm 20 and to each other by means of pivot pins 68, 70, 72 and 78. Each of these pivot pins is an allen headed shaft threaded at one end and adapted to threadably engage the corresponding members 20, 62 and 66 and are tightened tight enough to provide firm frictional engagement between the mating linkage members and their end connection, such frictional engagement being small enough to allow manual manipulation by the operator but strong enough to hold the linkage rigid during operation of the apparatus.

The clamping member 66 is more clearly illustrated in FIG. 3 of the drawing and includes a notched upper end 80 for receiving the linkage member 65 and pivot pin 78. The lower portion thereof is provided with a relief opening 82 which has a pair of facing semi-cylindrical sidewalls 84 for clampingly receiving a cylindrical shaft 86. Extending laterally through member 66 is a bore which is threaded at 88 to receive the threaded shaft of a thumb screw 90 that when tightened causes the lower portions of member 66 to be drawn together so that the surfaces 84 clampingly engage shaft 86.

At the lower extremity of member 66 a pair of facing dove-tailed shoulders 92 are provided so that member 66 can alternatively be used as a means of directly engaging the indicator 12. However, in the preferred embodiment, the member 12 is engaged by a second clamping member 94 that includes the shaft 86 so as to permit adjustments about a third axis, i.e., the axis of shaft 86.

An alternative to the dove-tailed clamping shoulders 92 is shown in FIG. 3a and includes a pair of rods 93 which are soldered or welded to the shoulders 95 of a modified member 66'. As illustrated in the drawing, the rods 93 engaged the grooved edges of holder 12 and provide a firm grip for securing it to the holder 10.

As additionally illustrated in FIG. 4 which is generally a plan view taken along the line 4—4 of FIG. 1, clamping member 94 includes, in addition to shaft 86, a central member 96 which is rigidly secured to shaft 86 by means of a screw 98, a pair of side members 100 which are pivotally secured to member 96 by means of a pivot pin 102, a pair of clamping elements 104 which are respectively pivotally attached to members 100 by pivot pins 106, a spring 108 for causing the member 104 to pivot outwardly about the pins 106 and a threaded thumb screw 110 which extends through members 104 and along the central axis of spring 108 and having a distal end 112 which threadably engages a barrel shaped threaded element.

Although shown slightly separated for clarity, it will be appreciated that the facing sides of members 100 frictionally engage the sidewalls of member 96 to a degree similar to that of the several linkage members 60-65 thereby normally holding the walls 100 rigid relative to member 96 but allowing operator adjustment thereof. The spring 108 and thumb screw 110 cause clamping elements 104 to pivot outwardly as thumb screw 110 is loosened, and allow those elements to swing inwardly as thumb screw 110 is tightened thereby enabling the dove-tailed notches 116 to clampingly engage corresponding edges along one side of the indicator 12.

In operation, once the device 10 is clamped to indicator 12 and mated with chuck 14, a work piece such as that indicated at 120 in FIG. 1 is positioned such that the center line of spindler 14 appears to coincide with the center line of a bore 112. Indicator 12 is then moved into position by forcing the articulated linkages into the desired position, and a predetermined indicator force is caused to be registered on indicator 12 by adjusting the fine adjust thumb wheel 26. The spindle is then turned noting any variations in the indicator reading as the indicator feeler 13 moves from one surface contact position to another. After several readings have been noted around the work piece, the work piece is moved left or right, fore or aft, or any combination thereof and the operation is repeated until the bore 112 is centered to a specified tolerance. The holder 10 is then removed from chuck 14 and replaced by a suitable drilling, milling or boring head.

For those applications in which the desired measurement exceeds the length of the articulated members shown in FIG. 1, an extender shaft 130 is inserted into the bore 24 of body 16 as shown in FIG. 5 and is locked in place by means of the thumb screw 54. Clampingly attached to a distal portion of shaft 130 is another articulated linkage including a clamping component 134 for clampingly engaging rod 130, an intermediate member 136 pivotally secured to member 134, and a clampingly member 66' similar to that shown in FIG. 4. The clamping member 66 clampingly engages an edge of an indicator 12. Meanwhile the linkages 60-66 are retracted out of the way as indicated at 140. As will be noted, indicator 12 can now be used to determine the centering accuracy of the outer edge of a cylindrical plate projection 142. Note that just as in the previous embodiment, adjustment of thumb wheel 26 can be used to provide fine adjustment of the positioning of the feeler 13 of indicator 12.

Although the present invention has been described in terms of a single embodiment and an extension thereof, it is understood that additional linkages and component configurations could also be utilized without departing from the spirit of the invention. It is therefore intended that the appended claims be interpreted as covering all such additions, alterations and modifications as fall within the true spirit and scope of the invention.

What is claimed is:

1. An adjustable indicator holder comprising:
   a body member including
   means for engaging a spindle device,
   a transversely disposed elongated arm pivotally secured thereto at a point intermediate its ends, and
   adjustment means for applying a pivoting force to said lever arm;
   articulated linkage means including a plurality of linking elements frictionally engaged to each other and having one extremity thereof pivotally attached to said lever arm, each said element of said linkage means being secured to an adjacent element by means of pivot pins the axes of which all lie in parallel lines; and
   clamping means attached to the other extremity of said linkage means, said clamping means being adapted to clampingly engage a saturated indicator means and being rotatable relative to said linkage means and about an axis normal to planes including the axes of said pivot pins whereby said indicator can be roughly positioned by frictionally deforming said linkage means, and said adjustment means can be used to finely position said indicator means with any desired accuracy.

2. An adjustable indicator holder comprising:
   a body member including
   means for engaging a spindle device, a transversely disposed elongated arm pivotally secured thereto at a point intermediate its ends, and
   adjustment means for applying a pivoting force to said lever arm;
   articulated linkage means including a plurality of linking elements frictionally engaged to each other and having one extremity thereof pivotally attached to said lever arm; and
   clamping means attached to the other extremity of said linkage means, said clamping means being pivotally secured to one end to the distal extremity of said linkage means and having an opposite end provided with means forming a pair of facing clamping surfaces adapted to engage one side of a standard indicator device, whereby said indicator can be roughly positioned by frictionally deforming said linkage means, and said adjustment means can be used to finely position said indicator means with any desired accuracy.

3. An adjustable indicator holder as recited in claim 2 wherein said clamping means includes a first body having a shaft protruding from one end thereof, first and second members affixed to the opposite end thereof, and first and second elements pivotally affixed to said first and second members and forming said clamping surfaces.

4. An adjustable indicator holder as recited in claim 3 wherein said linkage means includes an element at said distal end having an opening for receiving said shaft, said opening being reducible in diameter to clampingly engage said shaft.

5. An adjustable indicator holder as recited in claim 2 or 3 wherein said clamping means includes a thumbscrew for drawing the means forming said clamping surfaces toward each other.

6. An adjustable indicator holder as recited in claim 2 wherein said facing clamping surfaces are generally dove-tailed in configuration.

7. An adjustable indicator holder as recited in claim 2 wherein said facing changing surfaces are generally semi-cylindrical in configuration.

8. An adjustable indicator holder as recited in claim 2 wherein said elongated arm has an opening provided in one end thereof; and further comprising
    an elongated extender bar having one end adapted to mate with said opening and another end; and
    additional articulated linkage means attached to said another end of said extender bar and adapted to carry a standard indicator means.

* * * * *